United States Patent [19]
Morgan

[11] 3,983,747
[45] Oct. 5, 1976

[54] FUEL ECONOMY TRANSDUCER FOR MOTOR VEHICLE

[75] Inventor: Robert E. Morgan, Grand Rapids, Mich.

[73] Assignee: General Motors Corporation, Detroit, Mich.

[22] Filed: Nov. 17, 1975

[21] Appl. No.: 632,225

[52] U.S. Cl. ............................ 73/114; 73/DIG. 11
[51] Int. Cl.² ........................................ G01F 9/00
[58] Field of Search .......... 73/114, DIG. 11, 194 E; 250/232, 233; 235/150.21, 196

[56] References Cited
UNITED STATES PATENTS

| | | | |
|---|---|---|---|
| 2,623,389 | 12/1952 | Oosterom | 250/233 X |
| 3,654,480 | 4/1972 | Stephenson | 250/233 X |
| 3,908,451 | 9/1975 | Walker et al. | 73/114 |

Primary Examiner—Jerry W. Myracle
Attorney, Agent, or Firm—Warren D. Hill

[57] ABSTRACT

A transducer includes a lamp producing a light beam and a photodetector for sensing the light beam. A turbine in the vehicle fuel line rotates at a rate proportional to fuel usage and carries a shutter having a wide opening for intermittently interrupting the light beam. A second shutter driven according to vehicle speed includes a plurality of teeth for interrupting the light beam at a frequency proportional to vehicle speed. The resulting signal from the photodetector is a series of pulses arranged by groups wherein the number of pulses in each group is proportional to the distance traveled by the vehicle per unit of fuel consumption, e.g. miles per gallon.

4 Claims, 7 Drawing Figures

U.S. Patent    Oct. 5, 1976    3,983,747
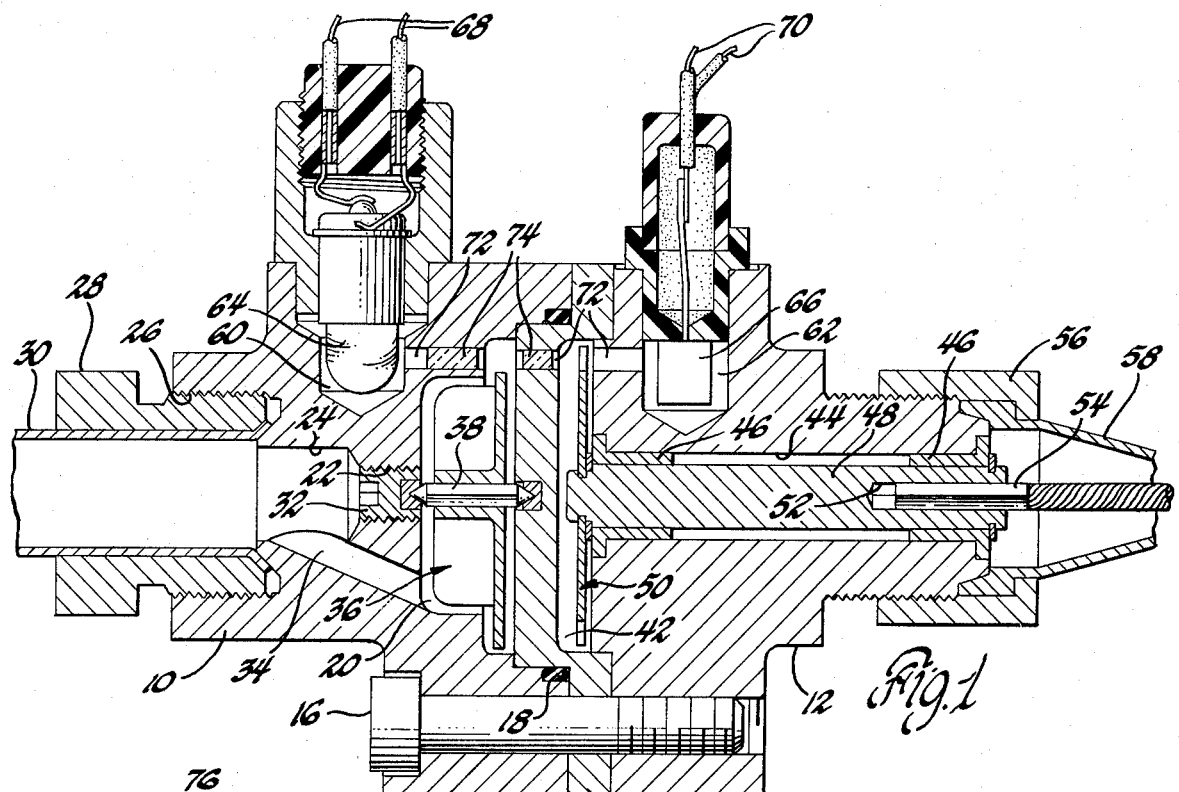
Fig. 1
Fig. 2
Fig. 3
Fig. 4a
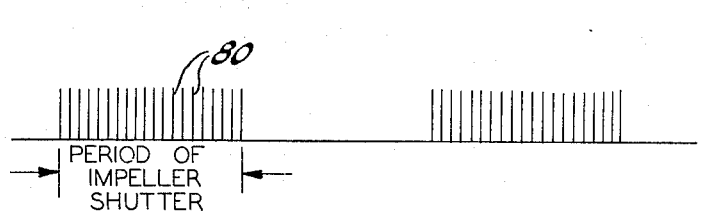
PERIOD OF IMPELLER SHUTTER
Fig. 4b
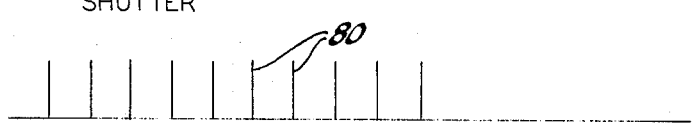
Fig. 5a
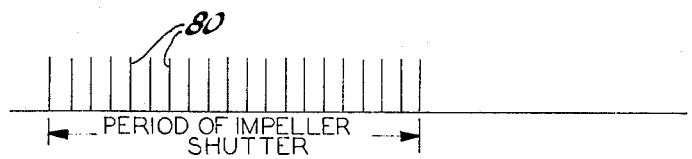
PERIOD OF IMPELLER SHUTTER
Fig. 5b

FUEL ECONOMY TRANSDUCER FOR MOTOR VEHICLE

This invention relates to fuel economy transducers and especially to such a transducer providing an electrical signal having a characteristic proportional to fuel economy.

It has previously been proposed to determine fuel economy by separately measuring the rate of fuel consumption and the rate of vehicle speed to obtain two output signals which are correlated usually by an electrical circuit to calculate the distance traveled per unit of fuel consumed. Thus two separate transducers and a computation device are required to produce the fuel economy information.

It is an object of this invention to provide a single transducer responsive to fuel flow and vehicle speed to produce an electrical signal substantially proportional to fuel economy.

It is a further object of the invention to provide such a transducer incorporating optical modulation according to fuel usage and vehicle speed.

The invention is carried out by providing in a single transducer a light source providing a light beam and a light detector to sense the beam, a first modulator responsive to fuel consumption rate for modulating the light beam at a frequency dependent on the fuel consumption rate and a second modulator responsive to vehicle speed for further modulating the light beam at a frequency according to vehicle speed so that the detector produces a signal having a characteristic proportional to vehicle distance traveled per unit of fuel consumed.

The above and other advantages will be made more apparent from the following specification taken in conjunction with the accompanying drawings wherein like reference numerals refer to like parts and wherein;

FIG. 1 is a cross-sectional view of a fuel economy transducer according to the invention;

FIG. 2 is a perspective view of a fuel flow impeller of FIG. 1;

FIG. 3 is a perspective view of a vehicle speed shutter of FIG. 1; and

FIGS. 4a, 4b, 5a and 5bare graphical illustrations of electrical signals produced by the transducer.

The fuel economy transducer, as shown in cross section in FIG. 1, includes a three-part housing comprising end sections 10 and 12 and an intermediate web member 14 held together by threaded fasteners 16. An O-ring seal 18 between the end member 10 and the web member 14 provides a fluid tight seal. The inner portion of the end member 10 contains a cavity which in cooperation with the web member 14 defines a fuel impeller chamber 20. The end member 10 includes a small threaded bore 22 axially aligned with the fuel impeller chamber 20, a larger diameter smooth bore 24 and a still larger diameter threaded outer bore 26, each aligned with the small threaded bore 22.

A nut 28 threaded into the outer bore 26 secures a fuel outlet line 30 to the end member 10. A longitudinally adjustable set screw 32 occupies the small threaded bore 22. A diagonal passageway 34 connects the fuel impeller chamber 20 with the bore 24. A vaned impeller 36 in the chamber 20 includes a small shaft 38 journalled at the center of the web portion 14 and at the set screw 32. A fuel inlet line 40 is connected to the end member 10 and to a passage way, not shown, which is directed tangentially to the fuel impeller chamber 20 so that fuel entering the chamber rotates the impeller 36 at a rate substantially proportional to fuel flow and the fuel exits the chamber through the passageway 34, bore 24 and fuel line 30.

The side of the web 14 opposite the chamber 20 has a cavity formed therein which in cooperation with the end member 12 forms a chamber 42. A bore 44 extending axially through the end member 12 has a bearing element 46 inserted in each end thereof to rotatably support a shaft 48. The inner end of the shaft carries a toothed shutter 50 for rotation therewith while the outer end of the shaft 48 has a square hole 52 formed therein to receive square shaft 54 of a rotary cable which is like a conventional speedometer cable and is similarly driven so that it imparts rotation to shaft 48 and shutter 50 proportional to vehicle speed. A nut 56 is threaded securely to the outer end of the end member 12 to clamp the sheath terminal portion 58 of the rotary cable assembly to the end member 12.

A pair of recesses 60 and 62 in one side of the end members 10 and 12, respectively, are adapted to receive a lamp 64 and a phototransistor 66, respectively. The lamp 64 is connected by leads 68 to a voltage source for illuminating the lamp and the phototransistor 66 is connected by leads 70 to a utilization circuit, not shown.

A series of small axially aligned bores 72 are formed in the members 10, 12 and 14 between the recesses 60 and 62 to form a path for a light beam from the lamp 60 to the phototransistor 66. The bore 72 in the members 10 and 14 contain plugs 74 of glass or other transparent material to seal the chamber 20.

As seen in FIG. 2, the impeller 36 has a base member 75 which carries an extension or a shutter portion 76 throughout a 180° segment of its rim, leaving a corresponding relieved or window area about the remainder of the rim. As the impeller 36 rotates in chamber 20 due to fuel flow, the shutter 76 periodically blocks and unblocks the light path between the lamp 64 and phototransistor 66. Thus light is able to pass only during the half revolution of the impeller 36 when the relieved or window portion is adjacent the light path. As a matter of design choice, the angle subtended by the shutter portion 76 may be greater or less than 180°.

As seen in FIG. 3, the shutter disk 50 has a plurality of teeth 78 preferably 20 in number although that is also a matter of design choice. When the shutter 50 is rotating in the chamber 42, the teeth 78 alternatively interrupt the light path. Thus when the impeller 36 and the shutter 50 are rotating, the light beam reaching the phototransistor 66 and, therefore, the electrical signals produced thereby will comprise a series of pulses produced by the rotation of the shutter 50 only when the shutter 76 on the impeller 36 allows passage of light and then the series of pulses is followed by a time interval of no pulses when the shutter 76 blocks the light path. Since the frequency of the pulses is determined by the vehicle speed and the frequency of impeller 36 is determined by the fuel consumption rate, the ratio of the disk RPM to the impeller RPM is proportional to fuel economy. Stated another way, the time period in which the impeller shutter is open to pass the light beam is inversely proportional to fuel consumption rate so that the product of that period and the frequency of light beam interruption by the shutter 50 is proportional to distance of vehicle travel per unit of fuel consumed or fuel economy. Thus the number of light pulses passed to the phototransistor 66 in each period is a direct measure of fuel economy. This is illustrated by FIGS. 4 and 5 wherein the vertical lines 80 are representative of current pulses generated by the phototransistor 66 and the width of each group of pulses represents the time period during which the impeller shutter is opened. The pulse lines 80, shown in the drawings, do not represent the true shape and width of each individual pulse; but rather the occurrence of each pulse. Thus, in FIG. 4a, ten pulses 80 occur in each period which is a measure of the distance traveled by the vehicle during the consumption of a predetermined unit of fuel. There ten pulses may represent, for example, 10 miles per gallon. In FIG. 4b, the impeller shutter period is the same as in FIG. 3; but the frequency of the pulses 80 is twice as great indicating the vehicle speed is twice as fast as in the case of FIG. 4a. Hence, the vehicle traveled twice as far per unit of fuel consumption and, therefore, the twenty pulses in each period of FIG. 4b represents 20 miles per gallon.

In FIG. 5a, the period of the impeller shutter is much larger than that in FIG. 4a, indicating a lower fuel consumption rate but the frequency of the pulses 80 is lower indicating a lower vehicle speed. The ten pulses occurring during the period in FIG. 5a represents 10 miles per gallon or the same economy as in FIG. 4a. Similarly, in FIG. 5b, the period is the same as in FIG. 5a but twenty pulses occur within that period to provide 20 miles per gallon as the fuel economy measure.

A design limit causes ambiguous results when the vehicle is stationary or moving at very low speeds, in which case the frequency of the pulses 80 may be lower than the frequency of the shutter 76. However, by appropriate selection of the impeller shutter opening angle, the impeller speed per unit of fuel consumed, as well as by the appropriate design of the shutter 50, i.e. the number of teeth 78 and the gearing ratio of the shutter drive mechanism, the fuel economy transducer will provide meaningful and accurate economy measurement from very low vehicle speeds to maximum vehicle speed.

It will thus be seen that in accordance with this invention, a single transducer responsive to both vehicle speed and fuel consumption rate provide an electrical signal proportional to fuel economy. In addition, it should be noted that the digital nature of the electrical signal allows it to be readily used by a digital utilization circuit to provide a fuel economy display. Obviously the same digital signal is readily converted for use by an analog utilization circuit, if desired.

The embodiments of the invention in which an exclusive property or privilege is claimed are defined as follows:

1. A fuel economy transducer for producing an electrical signal substantially proportional to distance traveled by a vehicle per unit of fuel consumed comprising
a light source providing a light beam along a path and a light detector in the path for producing an electrical output in response to the light beam,
first means responsive to the rate of fuel consumption for alternately blocking and unblocking the path of the light beam at a frequency substantially proportional to fuel consumption rate whereby each time period when the path is unblocked is inversely proportional to fuel consumption rate,
second means responsive to vehicle speed for periodically interrupting the path of the light beam at a frequency substantially proportional to vehicle speed and, at least above a minimum speed, at a frequency higher than the frequency of the first means,
whereby the electrical signal produced by the light detector comprises a number of pulses in each time period substantially proportional to distance traveled per unit of fuel consumed.

2. A fuel economy transducer for producing an electrical signal substantially proportional to distance traveled by a vehicle per unit of fuel consumed comprising
a light source providing a light beam along a path and a light detector in the path for producing an electrical output in response to the light beam,
first rotary shutter means, for alternately blocking and unblocking the path of the light beam, means for driving the first rotary shutter means at a rate substantially proportional to fuel consumption rate whereby each time period when the path is unblocked is inversely proportional to fuel consumption rate,
second rotary shutter means for alternately blocking and unblocking the path of the light beam,
means for driving the second rotary shutter means at a rate substantially proportional to vehicle speed for blocking and unblocking the path of the light beam at a frequency substantially proportional to vehicle speed and, at least above a minimum speed, at a frequency higher than the blocking frequency of the first shutter means,
whereby the electrical signal produced by the light detector comprises a number of pulses in each time period substantially proportional to distance traveled per unit of fuel consumed.

3. A fuel economy transducer for producing an electrical signal substantially proportional to distance traveled by a vehicle per unit of fuel consumed comprising
a light source providing a light beam along a path and a light detector in the path for producing an electrical output in response to the light beam,
a rotary transducer responsive to fuel consumption for rotation at a rate substantially proportional to fuel consumption,
first rotary shutter means carried by the transducer for interrupting the path of the light at a frequency substantial proportional to fuel consumption whereby each time period between interruptions of the path of the light beam is inversely proportional to fuel consumption rate,
second rotary shutter means axially aligned with the first rotary shutter means and driven at a rate substantially proportional to vehicle speed and having a toothed periphery for interrupting the path of the light beam at a frequency substantially proportional to vehicle speed and, at least above a minimum speed, at a frequency higher than the frequency of the first means,
whereby the electrical signal produced by the light detector comprises a number of pulses in each time period substantially proportional to distance traveled per unit of fuel consumed.

4. A fuel economy transducer for producing an electrical signal having a characteristic which varies substantially linearly in accordance with distance of vehicle travel per unit of fuel consumed comprising
a light source emitting a light beam and a light detector for providing an electrical signal in response to the light beam, first means controlled by fuel consumption rate for modulating the light beam according to fuel consumption rate,
second means controlled by vehicle speed for modulating the light beam according to vehicle speed,
the modulation of the light beam by the first and second means being superimposed such that a characteristic of the modulated light beam and the electrical signal varies according to the distance of vehicle travel per unit of fuel consumed.

* * * * *